(No Model.) 4 Sheets—Sheet 1.

L. EBERHART.
SEED SOWER.

No. 460,121. Patented Sept. 29, 1891.

Witnesses.
W. Rossiter
H. C. Kennedy

Inventor
Lloyd Eberhart
By Chas. G. Page
Atty.

(No Model.)  4 Sheets—Sheet 2.

L. EBERHART.
SEED SOWER.

No. 460,121. Patented Sept. 29, 1891.

Witnesses:

Inventor
Lloyd Eberhart
By Chas. G. Page
Atty.

(No Model.) 4 Sheets—Sheet 3.

L. EBERHART.
SEED SOWER.

No. 460,121. Patented Sept. 29, 1891.

Inventor
Lloyd Eberhart
By Chas. G. Page
Atty.

Witnesses.
W. Rossiter
H. C. Kennedy

THE NORRIS PETERS CO., PHOTO-LITHO., WASHINGTON, D. C.

(No Model.) 4 Sheets—Sheet 4.

L. EBERHART.
SEED SOWER.

No. 460,121. Patented Sept. 29, 1891.

Witnesses
W. Rossiter
H. C. Kennedy

Inventor
Lloyd Eberhart
By Chas. G. Page
Atty.

UNITED STATES PATENT OFFICE.

LLOYD EBERHART, OF JOLIET, ILLINOIS.

SEED-SOWER.

SPECIFICATION forming part of Letters Patent No. 460,121, dated September 29, 1891.

Application filed September 1, 1890. Renewed August 31, 1891. Serial No. 404,340. (No model.)

*To all whom it may concern:*

Be it known that I, LLOYD EBERHART, a citizen of the United States, residing at Joliet, in the county of Will and State of Illinois, have invented a certain new and useful Improvement in Seed-Sowers, of which the following is a specification.

My invention relates more particularly to broadcast seed-sowers, of the kind wherein the seed or fertilizer is discharged from a hopper onto a rotary distributer, and a valve provided for regulating the discharge.

The principal object of my invention is to provide, within practical limits, means whereby a greater number of differently-sized valve-ports or apertures for regulating the discharge can be employed than it has been possible to provide in seed-sowers as constructed prior to my invention, and to further avoid any and all necessity for the removal of a valve-plate having differently-sized apertures of one grade and the substitution therefor of another valve-plate having differently-sized apertures of a grade different from the apertures of the valve-plate for which it has been substituted.

To the attainment of the foregoing and other useful ends, my invention consists in matters hereinafter set forth, and particularly pointed out in the claims.

In the accompanying drawings.

Figure 1:
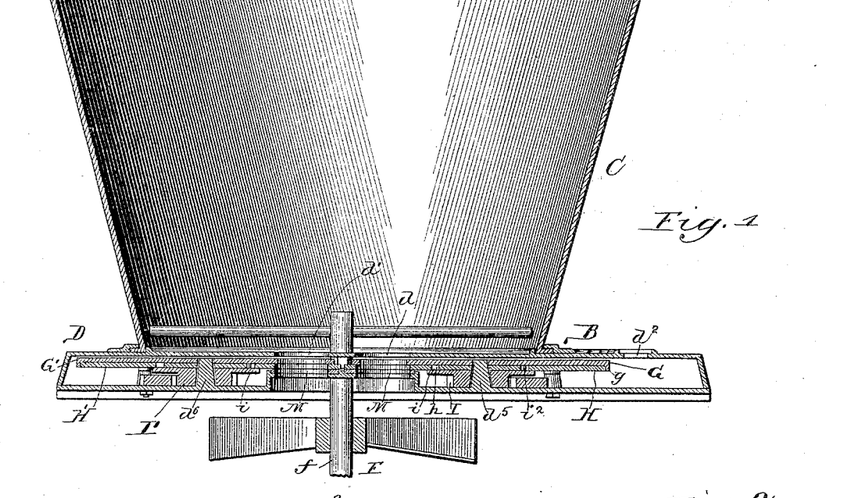
Figure 1 represents a section taken on a vertical central plane through the hopper and devices for controlling the discharge therefrom, the plane on which the section is taken being indicated by dotted line 1 1 in Fig. 2.
Figures 8, 9, 10, 11, 12:
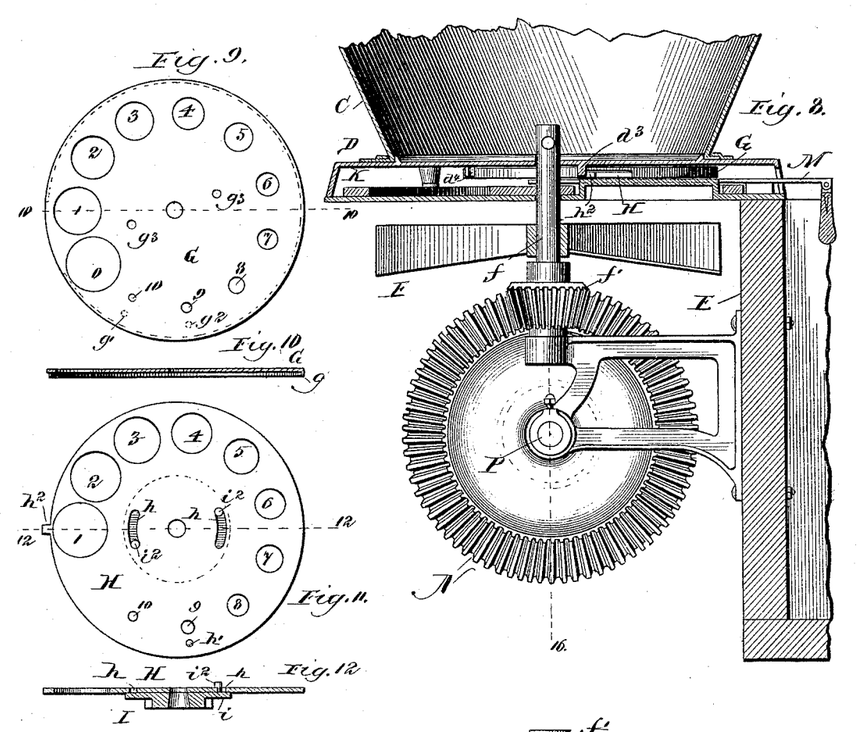
Fig. 8 represents the seed-sower, partly in elevation and partly in vertical section, the plane on which the section is taken being indicated by dotted line 8 8, Fig. 2.
Fig. 9 is a top plan view of an upper rotary valve-plate.
Fig. 10 is a section through Fig. 9, on dotted line 10 10.
Fig. 11 is a top plan view of a lower valve-plate.
Fig. 12 is a section through the valve-plate of Fig. 11 on dotted line 12 12 and also shows in section a cog upon which the valve-plate rests.

In said drawings, C denotes the hopper arranged upon a base or casing D, which latter, while affording a convenient support for the hopper, also serves to cover and protect the discharge-regulating devices. The hopper-base is in Fig. 8 shown supported and extended rearwardly from the end board E of a wagon, and below the hopper-base is a suitable rotary distributer F for receiving the seed or fertilizer from the hopper and distributing the same. The hopper is herein provided with two separate discharge-apertures $d$ and $d'$, which may be formed in any suitable bottom for the hopper or in the top of the base D, which serves to provide a convenient bottom for the hopper, as in Fig. 1, and in connection with such arrangement I provide two valve devices, one for each discharge-aperture, whereby the discharge may be made onto the distributer F at either of two points, of which one is back of the other relatively to the direction of rotation of the distributer. Said two valve devices are preferably alike in principle and mode of operation, and hence reference may first be made to the one in which G indicates the upper valve-plate and H the lower valve-plate, attention being particularly directed to Figs. 9 to 11, both inclusive. The upper valve-plate G is provided with a series of apertures, which are successively graduated in area and arranged at intervals along a circular line about its pivoted center, whereby when said valve-plate is arranged under the hopper-bottom, as in Fig. 1, it can be turned, so as to bring any one of its several apertures in register with the discharge-aperture $d$, which may be considered as being formed in the hopper-bottom. The lower valve-plate H is also provided with a series of apertures, which are successively graduated in area and arranged in a circular line about its pivotal center, and this lower valve-plate is arranged under the upper valve-plate G in order that the apertures of the two valve-plates may be brought into register. While I do not limit myself to the number of apertures in the valve-plates, I have shown the upper valve-plate provided with eleven apertures and the lower valve-plate provided with ten apertures, the provision of one more aperture in the upper than in the lower valve-plate being for a purpose hereinafter explained. The largest of the eleven apertures in the top valve-plate G is in the drawings indicated by 0, the next smaller aperture by 1, the next by 2, and so on up to 10, which denotes the smallest aperture of the series.

Figures 2, 3:
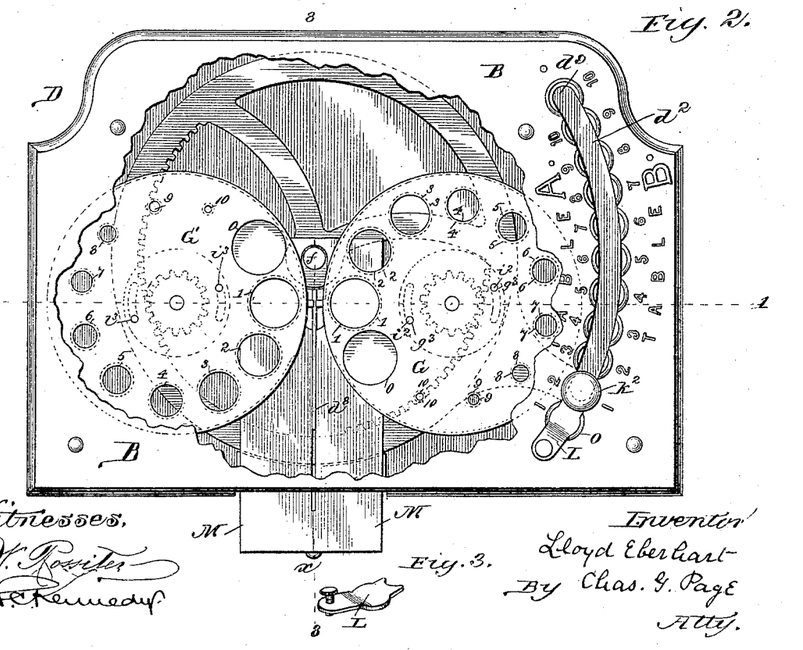
Fig. 2 is a top plan view of a hollow base serving to support the hopper and inclose certain of the discharge-regulating devices, of which latter, portions are exposed by reason of a portion of the top of the said hopper-base being broken away for convenience of illustration.
Fig. 3 represents in perspective a stop which is adapted to be detachably held upon the hopper-base, and which in Fig. 2 is shown placed in one of its two allotted positions.

In the lower valve-plate H the largest aperture is indicated by 1, the next smaller aperture by 2, and so on up to 10, which denotes the smallest aperture of the series. Of the ten apertures denoted by numbers in the upper plate, no one aperture is of the same size as any one of the ten apertures in the lower valve-plate, and, moreover, the said ten numbered apertures of the upper valve-plate are smaller relatively to the correspondingly-numbered apertures of the lower valve-plate—as, for example, aperture No. 1 of the top valve-plate is smaller than aperture No. 1 of the lower valve-plate, aperture No. 2 of the upper valve-plate is smaller than aperture No. 2 of the lower valve-plate, and so on to the smallest of the series, by which arrangement the apertures of one valve-plate may be said to be of a grade different from the grade of the apertures of the other valve-plate. The foregoing difference in the grade of the apertures of the two valve-plates G and H is best illustrated in Fig. 2, wherein aperture 1 of the upper valve-plate is in register with aperture 1 of the lower valve-plate, aperture 2 of the upper valve-plate in register with aperture 2 of the lower valve-plate, and so on, the circular edges of the apertures of the upper valve-plate being represented in full lines while the circular edges of the apertures of the lower valve-plate are indicated in dotted lines. Aperture 0 of the upper valve-plate is, however, preferably of the same size as aperture No. 1 of the lower valve-plate, in order that when a certain adjustment of one valve-plate relatively to the other valve-plate has been made aperture No. 1 of the lower valve-plate may be brought into register with aperture 0 of the upper valve-plate, as hereinafter more fully explained. By the foregoing arrangement the valve-plates can be adjusted or set relatively to one another, so that with the number of apertures herein shown twenty differently-sized apertures may be successively brought in register with the discharge-aperture $d$ in the hopper-bottom. Thus if the valve-plates are adjusted so as to bring holes 1 to 10 of the upper valve-plate in register with the correspondingly-numbered holes of the lower valve-plate, the discharge can be regulated solely by any one of the apertures of the upper valve-plate, in which, as hereinbefore observed, the apertures are graded smaller than the correspondingly-numbered apertures of the lower plate. Said adjustment is indicated in Fig. 2, wherein the apertures of the lower valve-plate H are indicated by dotted lines and numbered to correspond with the numbering in Fig. 11. On the other hand, however, the valve-plates can be relatively set or adjusted, whereby the apertures of the lower valve-plate may serve to regulate the discharge, as in Fig. 4, wherein each aperture of the lower valve-plate is in register with a somewhat larger aperture of the upper valve-plate, save in the case of aperture No. 1 of the lower valve-plate, which may now be in register with the correspondingly-sized aperture 0 of the upper valve-plate, it being seen in said Fig. 4 that aperture 2 of the lower valve-plate H is in register with the larger aperture 1 of the upper valve-plate, aperture 3 of the lower valve-plate in register with the larger aperture 2 of the upper valve-plate, and so on, the circular edges of all of the apertures in the two valve-plates being clearly shown, with the exception of the edge of aperture 1 of the lower valve-plate, which said aperture is equal in area to aperture 0 of the upper valve-plate and understood to be in register therewith.

While various mechanisms or valve-gearing can be employed for adjusting either or both of the valve-plates G and H relatively to one another in order to permit the ports or apertures of either to regulate the discharge, I shall now describe preferred means for adjusting and operating said valve-plates, which said means, for the general purpose of my invention, constitutes a valve-gear or valve-actuating mechanism adapted for shifting or adjusting one valve-plate relatively to the other, whereby, when desired, a shift or adjustment can be made to permit the quantity of the discharge from the passage or aperture $d$ in the hopper-bottom to be regulated by any one of the ports or apertures of the upper valve-plate which may be brought in register with said aperture in the hopper-bottom, while on the other hand by a reverse shift or adjustment the quantity of the discharge from said aperture in the hopper-bottom can be regulated by any one of the ports or apertures in the lower valve-plate which may be brought in register with the aperture in the hopper-bottom.

The upper valve-plate G is arranged over the lower valve-plate H, and is preferably, but not necessarily, provided with a pendent marginal flange $g$, Fig. 10, which, if present, may lap the edge of valve-plate H, and thus assist in maintaining the line of apertures of one valve-plate true with regard to the apertures of the other valve-plate. The lower valve-plate rests upon or is arranged over a gear or cog I, Figs. 12 and 13, which is desirably provided with a peripherally-arranged flange $i$ in order to afford a broad seat or bearing-surface for the lower valve-plate to rest upon without unnecessarily enlarging the toothed portion of the cog. Said cog is further provided with one or more pins $i^2$, which extend upwardly through curved slots $h$ in the lower valve-plate H, and engage in holes or sockets $g^3$ in the upper valve-plate G, in which way, while the upper valve-plate and the cog are locked together, the upper valve-plate may be turned independently of the lower valve-plate to an extent proportional to the length of each slot $h$.

Figures 5, 6:
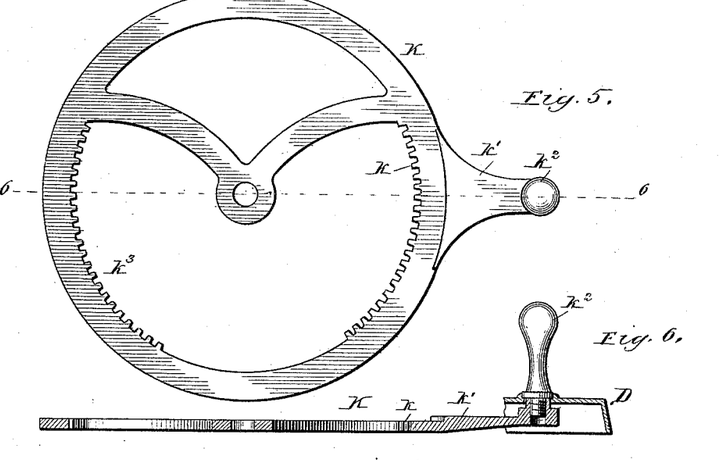
Fig. 5 is a top plan view of a ring-gear employed as a means for operating the rotary valve-plates.
Fig. 6 is a section taken through Fig. 5 on the dotted line 6 6.
Figure 7:
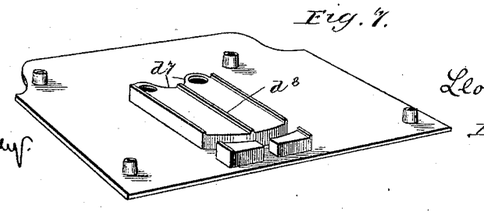
Fig. 7 represents on a smaller scale, in perspective, a plate adapted to serve as a bottom for the hopper-base and provided with guideways for the cut-off slides.

The cog I is engaged by teeth $k$ of a circular rack or rotary ring-gear K, (see Fig. 5,) which may have as its pivotal center the vertical shaft or spindle $f$ of the rotary distributer. This ring-gear is provided with a radially-arranged arm $k'$, carrying a handle $k^2$, which also serves as an indicator-arm. Said handle or indicator-arm $k^2$ extends down through a slot $d^2$ in the top of the hopper-base and screws into a socket in the arm $k'$ of the ring-gear, similarly to a thumb-screw, (see Fig. 6,) whereby the "handle," as it may be termed for convenience, may be turned, either to cause a shoulder thereon to bind on the top of base D, and thus lock the ring-gear against turning, or to loosen up the shoulder, so as to unlock said ring and permit it to be turned. I do not, however, limit myself to this particular form or construction of device for locking the ring-gear, since the same can be provided with any suitable form or construction of handle or indicator, and any suitable construction of latch or locking device can be employed for temporarily locking the ring-gear.

Figure 4:
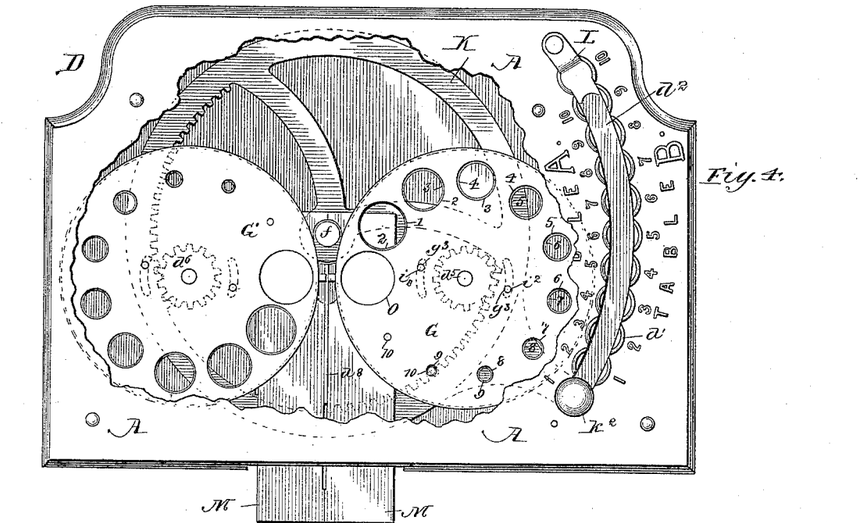
Fig. 4 is a view similar to Fig. 2, with the exception that in Fig. 2 the rotary valve-plates are set for table B, while in Fig. 4 the rotary valve-plates are set for table A, as hereinafter explained.

In Figs. 2 and 4 I arrange upon the top of the base D two graduated scales consisting of numbers, which I denominate "tables," one of said tables being, as shown, marked "Table A" and the other "Table B," it being proposed to permanently provide the base in such case with lettering to such effect. Table A, arranged along one side of the slot $d^2$, refers to the apertures of the lower valve-plate, while table B, arranged along the opposite side of the slot $d^2$, refers to the apertures of the upper valve-plate.

Along each side of the slot $d^2$ I prefer providing a line of part circular ribs, which resemble to some extent eleven apertures intersected by the slot. These representations of apertures are, at the table A side of the slot, numbered from one to ten, the eleventh at such side being unnumbered. On the other hand, said representations of apertures are at the table B side of the slot numbered from one to ten alternately with the numbers at the opposite side—that is to say, No. 1 of table B is opposite No. 2 of table A, No. 2 of table B is opposite No. 3 of table A, and so on, there being no number opposite No. 1 of the table A, or I may, as shown, indicate it by 0. In connection with said slot I further provide in said Figs. 2 and 4 a detachable stop L, which may be applied to the top of the base D, so as to cover a certain portion of either end of the slot, as in Fig. 2, where it covers one end portion of the slot, and again in Fig. 4, where it is in position to cover the opposite end portion of the slot, the purpose of said slot being hereinafter explained.

In Fig. 2 the valve-plates are set with relation to one another for table B, whereby correspondingly-numbered apertures in the upper and lower valve-plates are in register, and hence the apertures of the upper valve-plate serve to regulate the quantity of the discharge. Thus when the two valve-plates G and H are set for table B aperture No. 1 of the upper valve-plate will register with the somewhat larger aperture No. 1 of the lower valve-plate, and so on, the size of the aperture in the lower valve-plate being in this connection indicated in dotted lines in Fig. 2. When the plates are thus set relatively to one another so as to gage the discharge by the apertures of the upper valve-plate, the stop L should be set as in Fig. 2, so as to cover the end portion of the slot opposite 1 of table A and prevent the handle $k^2$ from being brought opposite said number. The handle may, however, be shifted into position opposite any one of the ten numbers of said table B, which said numbers correspond with the apertures 1 to 10 of the upper valve-plate, and hence any one of said apertures may be brought under the discharge-aperture $d$ of the hopper-bottom by bringing the handle opposite such number of table B as corresponds with the number of such aperture of the upper valve-plate as it is desired shall be brought in register with the aperture in the hopper-bottom, it being understood that during such operation the two valve-plates are temporarily locked together by some suitable catch device—as for example, by a stud $h'$, Fig. 13, on one of said valve-plates engaging in one of a couple of indentations $g'$ and $g^2$ in the other valve-plate, one of said indentations $g'$ being shown in Fig. 13 in the upper plate, while in Fig. 9 the two indentations are indicated in dotted lines. In order to now set the valve device for table A so as to permit the lower valve-plate H to control the discharge, stop L should first be removed from the position it occupies at one end of the slot in Fig. 2, and transferred to the opposite end of the slot $d^2$, so as to occupy the position shown in Fig. 4, where it will obviously prevent the handle $k^2$ from being brought opposite 10 of table B. After said shift in the position of the stop L the handle $k^2$ can be moved opposite 1 of the table A. The act of moving the handle into said position turns ring-gear K to the right. Said action on the part of the ring-gear operates the cog I, which acts to cause the upper valve-plate G to make a partial turn to the right, the lower valve-plate being, during such movement held against rotation, as hereinafter set forth. The foregoing limited turn to the right of the upper valve-plate G serves to bring its aperture 0, Fig. 9, in register with aperture 1 of the lower valve-plate, which latter will be held stationary during such movement of the upper valve-plate, as is caused by moving handle $k^2$ to shift from 1, table B, to 1, table A, and, as a means for thus holding the lower valve-plate stationary at said time and for disconnecting the two valve-plates in order to permit the upper valve-plate G to move while the lower valve-plate stands still, I provide the lower valve-plate H with a marginal projection or lug $h^2$, Fig. 11, which, when the handle $k^2$ is brought into the position shown in Fig. 2, comes against a lug or stop $d^3$, Fig. 8, that depends from the top portion of base D, so as to project downwardly in the path traversed by the lug $h^2$ on the lower valve-plate. When, therefore, the handle is shifted to that end of the slot which will place it opposite 1 of table A, the turning of the ring-gear to the right will also turn the upper valve-plate to the right; but the lower valve-plate will during the movement of the handle from 1, table B, to 1, table A, be held stationary by reason of the opposition of stop $d^3$ to the lug $h^2$, the power applied in such case to turn the upper valve-plate serving to force the lug or tooth $h'$ on the lower plate out of engagement with the notch or indentation $g'$ in the upper valve-plate, whereby the latter will ride over said lug or tooth $h'$ until the shift or relative adjustment has been made and the handle is in the position shown in Fig. 4, at which said juncture the lug or tooth $h'$ will engage in the second notch or indentation $g^2$, and thereby again temporarily lock the two valve-plates together. After this last-described adjustment of the valve-plates has been made the apertures of the lower valve-plate will regulate the discharge, it being seen in Fig. 4 that when the valve-plates are thus set for table A, each aperture of the lower valve-plate will be in register with a larger aperture of the upper valve-plate, thereby in effect contracting the areas of the ports of the upper valve-plate to the respective areas of the apertures in the lower valve-plate. It will be also understood that after said valve-plates have been thus set for table A the handle $k^2$ can be moved along the slot from the end of the slot whereat it is shown in Fig. 4 to the point where it will be arrested by the stop L in said figure, since when the handle of the ring-gear is moved along the slot in a direction away from the position it occupies in Fig. 4, so as to turn the ring-gear to the left, the two valve-plates now locked together will turn to the left and thereby cause the lug $h^2$ on valve-plate H to move in a direction away from the stop $d^3$. In this way any of the apertures of the lower valve-plate can be brought into register with the discharge-aperture $d$ of the hopper-bottom, the desired aperture of the lower valve-plate being in such case brought into register with the hopper-bottom aperture $d$ by moving the handle $k^2$ into position opposite the number of table A, which is understood to refer to the size of aperture that is to be positioned for the discharge. In order to again adjust or set the valve-plates for table B, the stop L should be removed from its position shown in Fig. 4 and again placed in the position it occupies in Fig. 2. After said change has been made the handle should be moved along the slot until it is opposite 10 of table B, and hence at the end $d^9$ of the slot shown covered by the stop L in Fig. 4, but understood to be now uncovered. The movement of the handle toward this last-mentioned end of the slot will so turn the ring-gear that the two valve-plates (temporarily locked together) will be turned to the left, but when the handle $k^2$ reaches a point opposite No. 10 of table A (which said point is, as seen, between 10 of table A and 9 of table B) the lug $h^2$ of the lower valve-plate will strike against and be arrested by a stop $d^4$, Fig. 8, which, like the stop $d^3$, conveniently depends from the top portion of the base D. The movement of the lower valve-plate toward the left will therefore be checked as aforesaid, while the further movement of the handle $k^2$ to a point opposite 10 of table B at the end $d^9$ of the slot will serve to disengage the upper valve-plate from its engagement with the stud or tooth $h'$ of the lower and now stationary valve-plate, and permit the upper valve-plate to be turned until its several apertures register with larger apertures of the lower valve-plate, aperture No. 1 of the upper valve-plate being brought in register with aperture No. 1 of the lower valve-plate, and so on. After this shift from table A to table B has been made the handle can be moved back and forth along the slot and stopped at any point opposite a number of table B.

During each rotary adjustment of the upper valve-plate independently of the lower valve-plate the short slots $h$ in the lower valve-plate permit the required extent of movement on the part of the pins $i^2$, which lock the upper valve-plate to the cog I. The length of each slot $h$ corresponds to the distance between the two notches or indentations $g'$ and $g^2$ in the upper valve-plate, whereby when the tooth $h'$ is in either one of said notches or indentations the pins $i^2$ on the cog I will engage stops or abutments formed by end walls of the slots $h$, as in Fig. 11, the particular end walls of the slots engaged by the pins being of course determined by the particular one of the notches or indentations in which the stud or tooth $h'$ engages.

While various forms of racks or gears (either straight reciprocating or rotary reciprocating) could be employed, I prefer the circular rack or ring-gear herein shown, since it can be used with decided advantage for operating two valve devices each embodying the principles of operation hereinbefore described. I have therefore herein provided two of such valve devices or practically duplicated the hereinbefore-described valve device, whereby one valve device can be employed in connection with the aperture $d$ in the hopper-bottom and the other in connection with the aperture $d'$ in the hopper-bottom. The valve device for the hopper-aperture $d'$ comprises a couple of rotary valve-plates G' and H', herein understood to be apertured similarly to the valve-plates G and H and to be employed in connection with a cog I' and other adjuncts such as hereinbefore described in connection with the valve-plates G and H. In this connection, however, it may be observed that while the apertures of valve-plates G and H are shown as successively decreasing in area from left to right the apertures of valve-plates G' and H' successively decrease in area from right to left. Stops—such as the stops $d^3$ and $d^4$—for the lug $h^2$ of valve-plate H are also understood to be provided for a like lug on the valve-plate H', and, in short, the valve device comprising the valve-plates G' and H' and their adjuncts is simply a duplication of the valve device comprising valve-plates G and H and their adjuncts and operated simultaneously therewith and in a like way.

The two scales hereinbefore referred to as "table A" and "table B" have the same relationship to the apertured valve-plates G' and H' that they bear to the apertured valve-plates G and H, whereby by operating the handle or indicator of such rack or gear or other valve-operating device as may be employed for engaging the cogs of the two valve devices or otherwise suitably operating the same certain valve-plates of the two valve devices may be simultaneously adjusted and set for either table A or table B, and the two valve devices then simultaneously operated to bring the desired ports or apertures under the hopper-bottom apertures.

As herein arranged the valve-plates G and H are positioned to turn in both directions about a vertical axis or pivot $d^5$, common to both, and the valve-plates G' and H' are correspondingly arranged to turn about a vertical axis or pivot $d^6$, the two axes of the two valve devices being respectively at opposite sides of the distributer-spindle $f$, about which latter the gear or circular rack is herein shown arranged to turn in both directions.

Any suitable arrangement of cut-off slides can be provided for cutting off the flow of seed from either or both of the two points of discharge. As herein shown, the two cut-off slides M M are arranged to slide upon a raised portion $d^7$ of the bottom plate of base D, said raised portion being provided with a longitudinal centrally-arranged raised rib $d^8$, which stands between the cut-off slides for a portion of their length.

Figure 18:
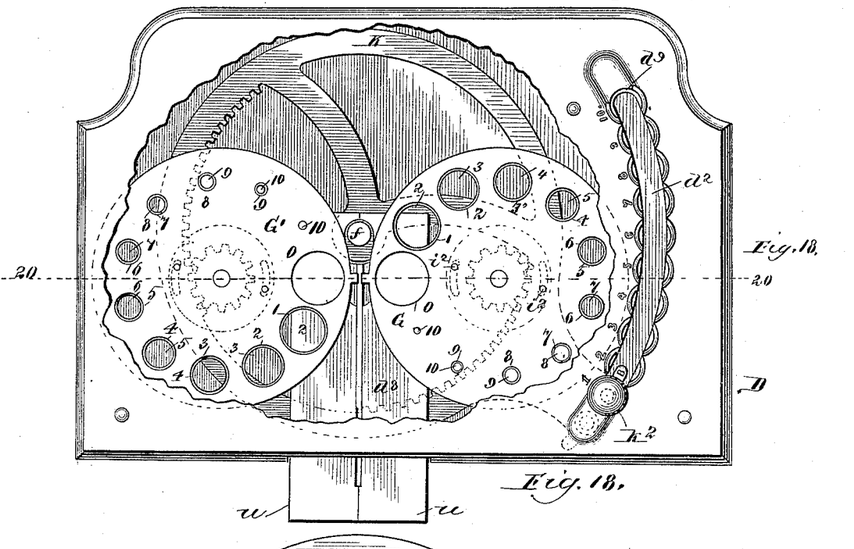
Fig. 18 is a view similar to Fig. 4, but illustrates means whereby the stop L employed in Figs. 2 and 4 can be dispensed with and but one row of numbers used in place of two rows of numbers for the tables A and B, illustrated in said Figs. 2 and 4.
Figure 19:
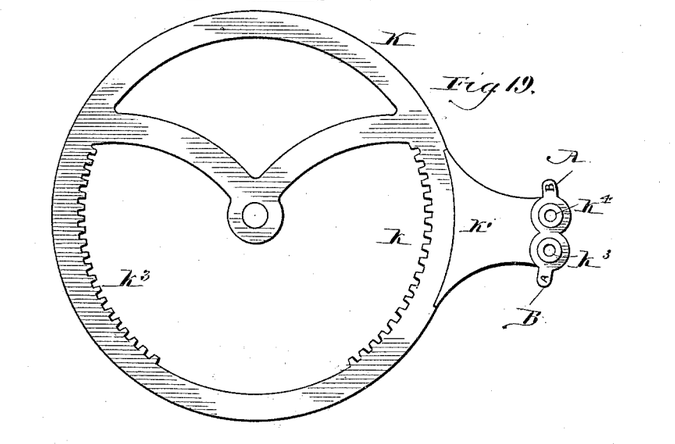
Fig. 19 is a top plan view of the ring-gear employed in Fig. 18.

In Fig. 18 the valve devices are constructed and adapted for operation as in preceding figures; but the stop L is dispensed with and but one row of numbers employed in place of the two rows of numbers hereinbefore described as the scales or tables A and B. The single line or row of numbers in Fig. 18 is arranged alongside the curved slot $d^2$, and as a means for operating the ring-gear K an indicator arm or handle $k^2$, such as hereinbefore set forth, can be employed. The arm $k'$ of the ring-gear shown in Figs. 18 and 19 is, however, provided with two sockets $k^3$ and $k^4$, in either of which the lower threaded stem portion of the handle can be removably fitted. The arm $k'$ of the ring-gear shown in said last-mentioned figures is also provided with the letters A and B, respectively, arranged at opposite sides of the pair of sockets $k^3$ and $k^4$, and understood to denote two scales or tables, whereof one relates to the set of apertures of the upper valve-plates G and G', while the other relates to the set of apertures of the lower valve-plates H and H'. By shifting the handle $k^2$ from one to the other of the two sockets in the arm of the ring-gear I can attain the same result that I attain by using the hereinbefore-described stop L. Thus in Fig. 18 the handle $k^2$ is understood to be fitted in socket $k^4$ and is shown at one end of slot $d^2$, in which position the handle is opposite 1 of the row of numbers alongside the slot. When the handle has been thus fitted in socket $k^4$ and brought opposite number 1 on the base-plate, the valves will be set for table A, as in Fig. 4, aperture 1 of each upper valve-plate being over a somewhat smaller aperture 2 of its allotted lower valve-plate, and so on, whereby the valves are set relatively to one another to govern the quantity of the discharge by any one of the apertures of the lower valve-plates. The handle thus connected with the ring-gear can now be moved at will from one to the other end of the slot $d^2$ and stopped opposite any one of the row of numbers alongside said slot, the number at which it is thus stopped now serving to indicate that the valve devices are in position to permit the discharge from each aperture in the hopper-bottom to be regulated by a particular aperture of each lower valve-plate, it being understood as a matter of course that to permit the flow of seed from either aperture in the hopper-bottom the cut-off slide allotted to the aperture from which the discharge is to be established must be drawn out to a suitable extent.

It will be seen that in Fig. 18 the handle $k^2$ is adjusted on the arm of the ring-gear so as to permit the ring-gear to be turned to the right to the farthest permissible extent in this direction, in which way said adjustment of the handle corresponds to removal of stop L from the position it occupies in Fig. 2, so as to permit the handle to be brought into the position shown in Fig. 4. When, however, the handle is moved along the slot so as to turn the ring-gear to the left and bring the handle from its position in Fig. 18 to the opposite end of the slot, it will be seen that the ring-gear cannot be turned to its farthest permissible extent since the handle will strike against and be arrested by the wall at the end $d^9$ of the slot; but by transferring the handle from socket $k^4$ to socket $k^3$ the extent of movement of the arm $k'$ of the ring-gear toward the end $d^9$ of the slot may be increased to an extent equal or substantially equal to the distance between the sockets $k^3$ and $k^4$, it being evident that when the handle is in socket $k^3$ and moved toward the end $d^9$ of the slot it will not strike the end wall at said end $d^9$ of the slot as soon as it would if it were in socket $k^4$. These adjustments of the handle from one socket to the other correspond therefore in principle to the shift of stop L from one to the other end of the slot, it being seen that while in Fig. 2 the presence of the stop L over one end of the slot limits the movement of the handle toward said end, substantially the same limitation can be made in Fig. 18 by transferring the handle from socket $k^3$ to socket $k^4$, since while in the latter case the handle could still strike the end wall of the slot its said transferment of the handle will shorten the throw of the arm $k'$ of the ring-gear in one direction. In Fig. 4 the valves, as hereinbefore set forth, are set for table A—that is to say, the upper valve-plates have been adjusted relatively to the lower valve-plates, whereby the quantity of the discharge can be regulated by any one of the apertures of the lower valve-plates. In Fig. 18 a like relative adjustment of the valve-plates has been made, and hence the valves in said figure may be said to have been set for table A. By transferring the handle from socket $k^4$ to socket $k^3$, however, the valves can be set for table B, it being only necessary to make such adjustment or transferment of the handle and then bring it to the end $d^9$ of the slot, the shift of the valve-plates being made in the same way as described in connection with preceding figures. When, however, the handle has been again fitted in socket $k^4$ and brought into the position shown in Fig. 18 the valves will be set for table A, and hence when the handle is moved opposite any one of the numbers—for example, No. 1—the operator will know that the aperture 1 of the lower valve-plate H is under one of the apertures $d$ in the hopper-bottom to regulate the quantity of the discharge therefrom, and that aperture 1 of the valve-plate H' is in position under the remaining aperture in the hopper-bottom for a like purpose. In this connection it may be repeated that when the apertures of the lower valve-plates regulate the discharge apertures 1 of the lower valve-plates are in register with corresponding apertures 0 of the upper valve-plates. To further illustrate the foregoing, when the handle fitted in socket $k^4$, as in Fig. 18, is, for example, brought opposite 5 alongside the slot the apertures indicated as 5 in the lower valve-plates and in register with larger apertures 4 of the upper valve-plates will be brought into register with the apertures in the hopper-bottom.

The letter A on the arm $k'$ of the ring-gear is nearest the socket $k^4$, while the letter B is nearest the socket $k^3$, in which way said letters serve as a convenient guide to the operator who, when he desires to relatively adjust the valve-plates for table A, will fit the handle in socket $k^4$ and then move the handle in the position shown in Fig. 18, while on the contrary, when he desires to adjust for table B, he will fit the handle in socket $k^3$ and move the handle along the slot until it reaches the end wall $d^9$ thereof.

With reference to the terms "table A" and "table B" or the use of such letters it is understood that any other letters or suitable words can be employed, it being seen that either of the two arrangements hereinbefore described involve, as a matter of principle, a valve-gear or valve-actuating device and a suitably-arranged scale referring to the apertures of the upper valve-plates and the lower valve-plates, and that the device herein termed a "handle" is in fact a pointer or indicator which may be conveniently, although not necessarily, used as a handle, since so long as it serves as a pointer or indicator arm or finger any other handle for operating the valve-gear could be employed.

Figures 13, 14, 15, 16, 17:
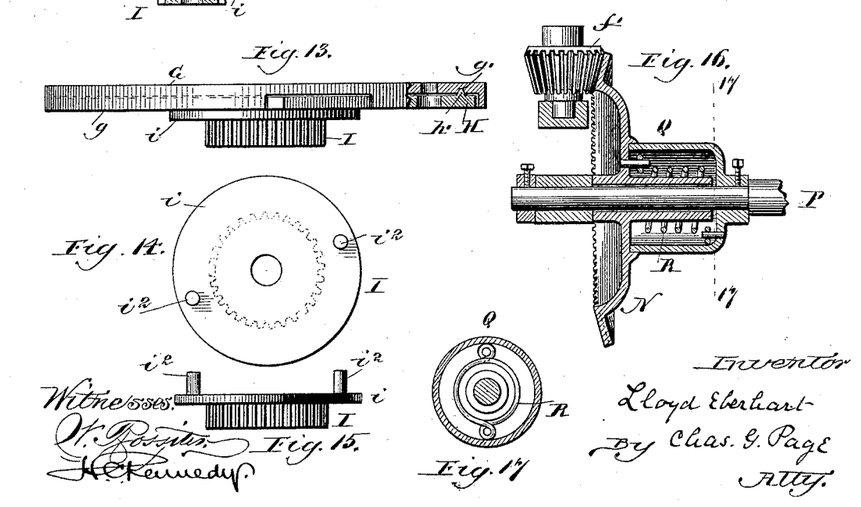
Fig. 13 represents, on a somewhat larger scale, an edge view of one of the upper valve-plates arranged upon its allotted lower valve-plate, which latter rests upon a cog, such as shown in Fig. 12, portions of the two valve-plates being in section for convenience of illustration.
Fig. 14 represents a top plan view of the cog of the preceding figure, the toothed portion of the cog being indicated in dotted lines.
Fig. 15 is an edge view of said cog.
Fig. 16 is a section taken on a vertical plane through the driving-gear for operating the rotary distributer, the plane of said section being indicated by line 16, Fig. 8.
Fig. 17 is a section taken transversely through the device of Fig. 16 on line 17 17.

Referring now to Fig. 16, which may be considered in connection with Fig. 8, $f'$ indicates a small bevel-gear, which is fixed upon the spindle $f$ of the rotary distributer and arranged to engage the large bevel-gear N. The large gear N is arranged loose upon the rotary driving-shaft P, which said shaft is understood to be driven in any suitable way—as, for example, from one of the rear wheels of a wagon, as in other seed-sowers. The shaft P carries a box or hollow hub Q, which is fixed upon the shaft and adapted to contain a spring R. The spring serves as a yielding spring connection between the shaft and the large gear, and to such end one end of the spring is connected with the hub R, while its opposite end is connected with the large gear N. By such arrangement the spring is interposed as a connection between the source of driving-power and the rotary distributer, whereby all jerky motion of the rotary distributer, when the machine is running over rough or unplowed ground, is avoided, and a steady motion on the part of the rotary distributer insured.

Figure 20:
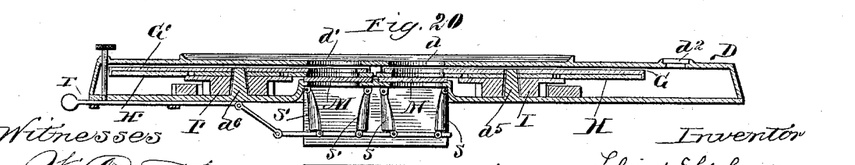
Fig. 20 represents a section taken transversely through the hopper-base and valves on a plane indicated by line 20 20, Fig. 18, and also shows in elevation a seed guiding or deflecting device for determining the point or points whereat it is desired the seed shall discharge onto the rotary distributer.
Figure 21:
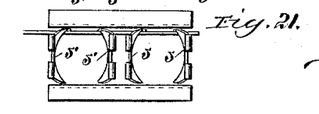
Fig. 21 represents a top plan view of the seed guiding or deflecting device detached from the hopper-base.

In Figs. 20 and 21 I have shown a couple of deflectors, one for each aperture in the hopper-bottom. The deflector for the hopper-bottom aperture $d$ consists of a couple of plates S, which are hinged at their upper ends to the hopper-base and arranged to depend therefrom, while the deflector for the hopper-bottom aperture $d'$ consists of a couple of plates S', arranged like the plates S. The plates are curved in cross-section and arranged to normally hang in position to permit the discharge from the hopper-bottom to fall directly down onto the rotary distributer, to which said end plates S are hinged, respectively, at opposite sides of the point of discharge from aperture $d$ in the hopper-bottom, and plates S' are similarly hung with relation to the point of discharge from the aperture $d'$ in the hopper-bottom. These plates are also curved in cross-section, whereby the plates S conjointly constitute walls of a passage leading down from the bottom-plate of the hopper-bottom to a point which should be as close as practicable to the rotary distributer, while on the other hand the plates S' constitute walls of a like passage. These deflectors can, however, be shifted laterally, so as to direct the seed onto the rotary distributer at points farther forward or farther back relatively to the direction of rotation of the rotary distributer, whereby the cast can be regulated. As one of various means for shifting the deflectors, a slide-rod T is herein connected with the deflectors by suitable link connections. In connection with said slide-rod I can employ any suitable latching or locking device, whereby after the shifting or adjustable deflectors have been properly set they can be locked in such position.

What I claim as my invention is—

1. In a seed-sower, a valve device for regulating the quantity of the discharge, consisting of a pair of rotary valve-plates arranged one above the other and each provided with a series of graduated apertures, one of said valve-plates being adjustable relatively to the other and having a different grade of apertures, whereby the discharge through the valve device can be controlled either by the apertures of the upper valve-plate or by the apertures of the lower valve-plate, substantially as and for the purpose described.

2. The combination, substantially as hereinbefore set forth, with the hopper having a couple of discharge-apertures leading therefrom, of the two valve devices, each comprising a couple of rotary valve-plates, whereof one is adjustable relatively to the other for the purpose described, said valve-plates being severally provided with graduated apertures arranged in series, substantially as described.

3. In a seed-sower, a valve device comprising an upper valve-plate provided with a graduated series of apertures combined with a lower valve-plate likewise provided with a graduated series of apertures, of which no one aperture is of the same size as any one of a corresponding number of apertures in the upper valve-plate, substantially as and for the purpose described.

4. In a seed-sower, a valve device comprising an upper valve-plate having a graduated series of apertures combined with a lower valve-plate having a graduated series of apertures, valve-gear connected with one valve-plate, and a locking device to temporarily lock together the two valve-plates, whereby when the two plates are locked together both may be synchronously operated by the valve-gear, while on the other hand when the valve-plates are unlocked one of said valve-plates can be operated by the valve-gear in order to adjust its apertures relatively to the apertures of the other valve-plate, substantially as and for the purpose described.

5. The combination, with the upper valve-plate G, provided with a graduated series of openings, of the lower valve-plate H, provided with a graduated series of openings, and the cog I, arranged below the lower valve-plate and provided with one or more studs, which extend upwardly through one or more slots in the lower valve-plate and engage the upper valve-plate, whereby the upper valve-plate and cog are capable of a conjoint movement independently of the lower valve-plate in order to change the position of the apertures in one valve-plate relatively to the apertures in the other valve-plate, substantially as and for the purpose described.

6. The combination, with the upper valve-plate G, having a graduated series of openings, of the lower valve-plate H, having a graduated series of openings, and means adapted for temporarily locking the plates together in different relative positions, and consisting of a tooth upon one valve-plate arranged to engage in either of a couple of notches in the other valve-plate, substantially as and for the purpose described.

7. The combination, with the valve-plate G, having a graduated series of apertures, of the valve-plate H, having a graduated series of apertures, a valve-gear connected with one valve-plate, a locking device to temporarily lock the two valve-plates together in different relative adjustments, and stops, such as set forth, arranged to limit the rotation of one valve-plate in both directions, whereby when one valve-plate is arrested by either one of the stops the movement of the other valve-plate may be continued to an extent to cause the hereinbefore-described relative shift or adjustment of the valve-plates, substantially as and for the purpose described.

8. The combination, with a valve device comprising a couple of valve-plates respectively provided with graduated series of apertures whereof the apertures of one valve-plate may register with the apertures of the other valve-plate, substantially as set forth, of a valve-gear to operate the valve-plates and a scale such as herein set forth to indicate the position of the valve device, substantially as and for the purpose described.

9. The combination, with a valve device comprising a couple of valve-plates arranged one above the other and each having a series of graduated apertures, a hopper having a discharge-aperture, of a scale which is numbered with reference to the apertures of one and the other of said series, and a handle or pointer connected with the valve device and arranged to move along said scale, substantially as and for the purpose described.

10. The combination, substantially as hereinbefore set forth, of the hopper provided with a couple of discharge-openings, a valve device for each opening comprising two pairs of rotary plates with the plates of each pair arranged upon one another and respectively provided with a series of apertures successively graduated in area, the apertures of one series being of a grade different from the apertures of the other series for the purpose set forth, a ring-gear connected with one plate of each pair, a scale, and a pointer or indicator on the ring-gear arranged with reference to said scale.

11. The combination, substantially as hereinbefore set forth, of the hopper provided with a discharge-opening, a double valve for said opening comprising a pair of apertured plates, whereof one is provided with slots $h$ and the other provided with pins engaging in said slots, and a tooth $h'$ on one plate arranged for engaging in either one of a couple of recesses $g'$ and $g^2$ in the other plate.

12. The combination, with the rotary distributer, of the driving-shaft, suitably arranged gearing between the driving-shaft and the rotary distributer, and a spring connected at its opposite ends to said driving-shaft and to an element of said gearing and serving as a spring-power transmitting connection, substantially as set forth.

13. The combination, with the rotary distributer, of the driving-shaft provided with a hollow hub Q, a gear N, located adjacent said hub Q, and a spring arranged within said hub and connected at its opposite ends with said hub Q and gear N, said gear N forming part of suitably-arranged gearing between the driving-shaft and rotary distributer, substantially as set forth.

14. The combination of a hopper and rotary distributer and an adjustable deflector comprising upright pivotally-supported plates for directing the discharge onto the distributer.

15. The combination of a hopper and rotary distributer and an adjustable deflector, for the purpose set forth, comprising pendent movable plates S.

LLOYD EBERHART.

Witnesses:
FRANK H. McROBERTS,
H. E. HUTCHINSON.